United States Patent
Laurent et al.

(10) Patent No.: US 7,048,254 B2
(45) Date of Patent: May 23, 2006

(54) LOW-LEAKAGE VALVE APPARATUS

(75) Inventors: John Arthur Laurent, Gallup, NM (US); James Patrick Hallock, Gallup, NM (US)

(73) Assignee: Giant Industries, Scottsdale, AZ (US)

( * ) Notice: Subject to any disclaimer, the term of this patent is extended or adjusted under 35 U.S.C. 154(b) by 187 days.

(21) Appl. No.: 10/600,150

(22) Filed: Jun. 19, 2003

(65) Prior Publication Data
US 2004/0256589 A1    Dec. 23, 2004

(51) Int. Cl.
*F16K 31/44* (2006.01)

(52) U.S. Cl. .................. 251/214; 251/510; 251/518

(58) Field of Classification Search .......... 251/214; 277/510, 511, 518
See application file for complete search history.

(56) References Cited

U.S. PATENT DOCUMENTS

| | | | |
|---|---|---|---|
| 4,017,214 A | 4/1977 | Smith .................... 417/9 |
| 4,328,947 A | 5/1982 | Reimpell et al. ........ 251/80 |
| 4,570,942 A | 2/1986 | Diehl et al. ............ 277/12 |
| 4,765,631 A | 8/1988 | Kohnen et al. .......... 277/2 |
| 4,901,751 A | 2/1990 | Story et al. ........... 137/312 |
| 4,972,867 A | 11/1990 | Ruesch ................ 137/15 |
| 5,129,624 A | 7/1992 | Icenhower et al. ...... 251/214 |
| 5,170,991 A | 12/1992 | Heil .................. 251/214 |
| 5,174,250 A | 12/1992 | Lane .................. 123/41.44 |
| 5,178,363 A | 1/1993 | Icenhower et al. ...... 251/214 |
| 5,203,370 A | 4/1993 | Block et al. .......... 137/312 |
| 5,263,682 A | 11/1993 | Covert et al. ......... 251/214 |
| 5,326,074 A * | 7/1994 | Spock et al. .......... 251/214 |
| 5,388,805 A | 2/1995 | Bathrick et al. ....... 251/214 |
| 5,476,117 A | 12/1995 | Pakula ................ 137/312 |
| 5,716,055 A | 2/1998 | Wilkinson et al. ...... 277/102 |
| 5,865,441 A | 2/1999 | Orlowski .............. 377/364 |
| 5,979,491 A | 11/1999 | Gonsior ............... 137/375 |
| 6,056,005 A | 5/2000 | Piotrowski et al. ..... 137/248 |
| 6,382,633 B1 * | 5/2002 | Hashiguchi et al. ..... 277/511 |

OTHER PUBLICATIONS www.chemalliance.org web page, Proper Monitoring Essential to Reducing 'Fugitive Emissions' Under Leak Detection and Repair Programs, May 13, 2003, pp. 1-4.

* cited by examiner

*Primary Examiner*—Edward K. Look
*Assistant Examiner*—John K. Fristoe, Jr.
(74) *Attorney, Agent, or Firm*—Rod D. Baker; Peacock Myers, P.C.

(57) ABSTRACT

A low-leakage valve apparatus which reduces fugitive emissions from valves to the ambient atmosphere. A secondary packing chamber or gland is installed on an existing valve to intercept leakage past the valve's original primary packing gland, which otherwise would escape past the valve stem to the atmosphere.

18 Claims, 7 Drawing Sheets

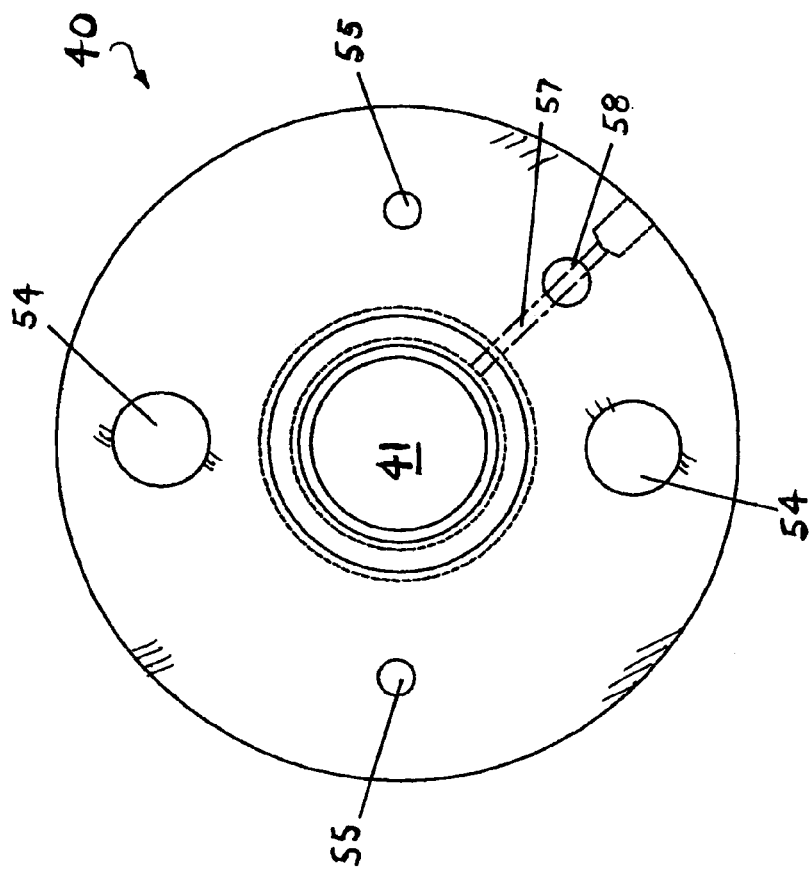
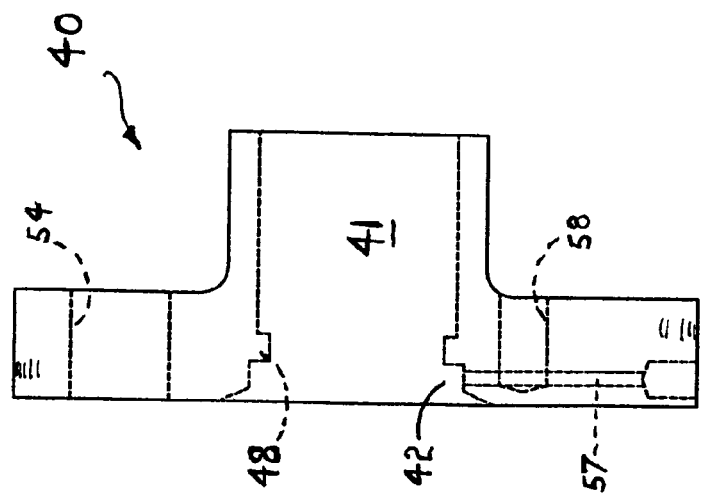

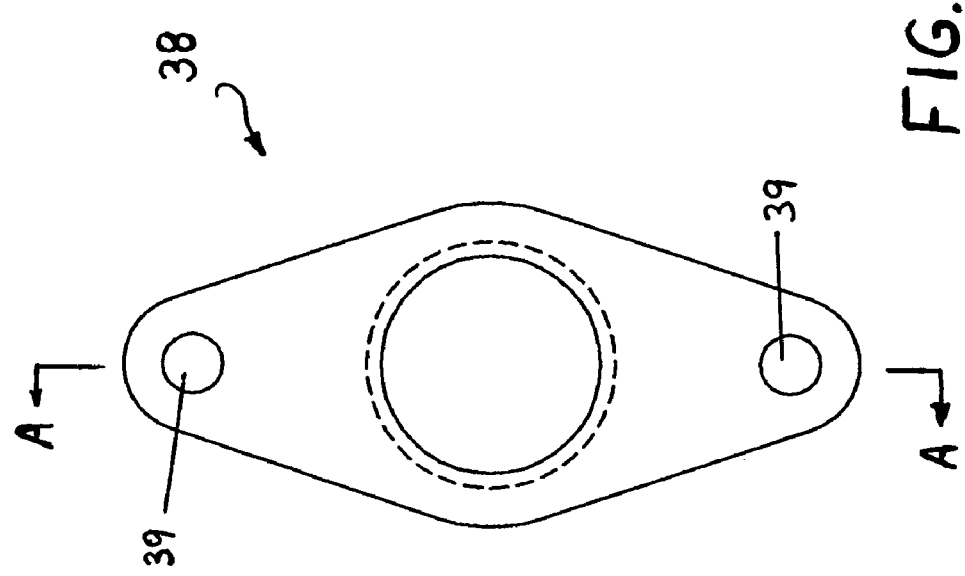
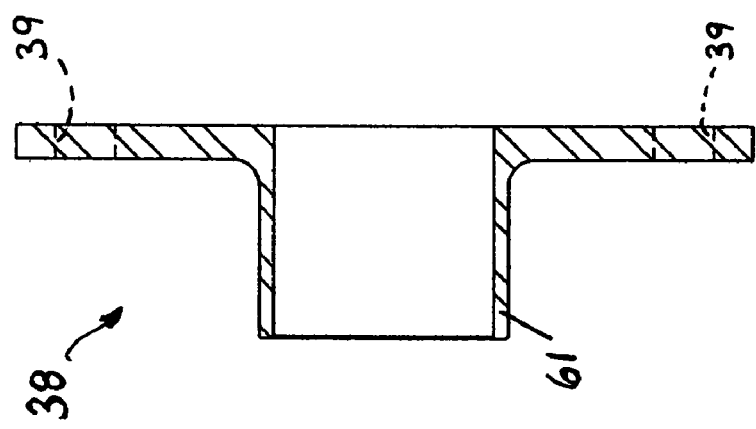
FIG. 5B
FIG. 5A

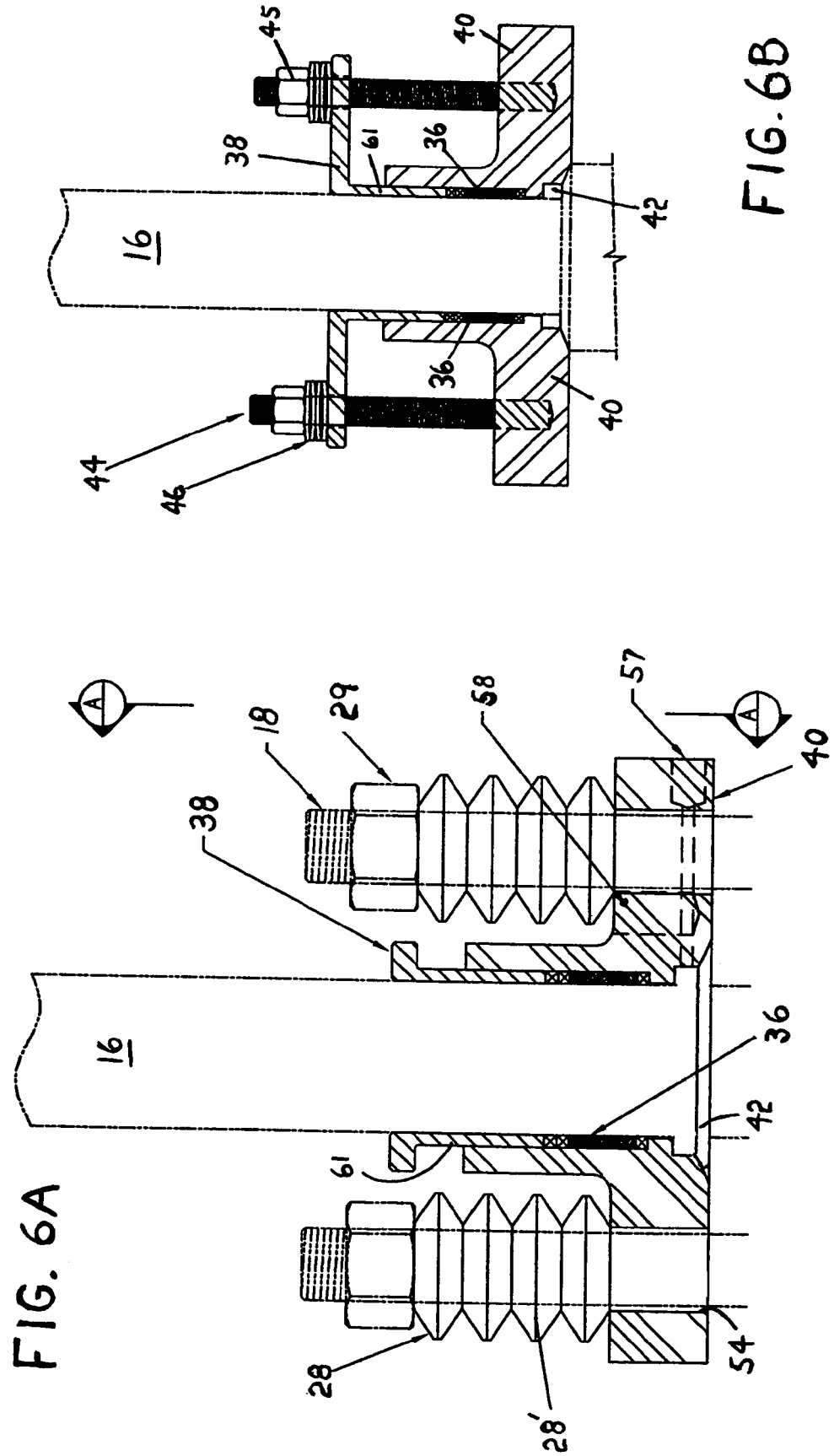

Gate Valves VOC Emissions

| Valve Test Tag # | Pre-Modification Test Date | | Post Modification Test Date | |
|---|---|---|---|---|
| | 22-Jan ppm | 16-Apr ppm | 19-Jun ppm | 31-Mar ppm |
| 4497 | 10000+ | 10000+ | 10 | 70 |
| 4499 | 10000+ | 10000+ | 200 | 40 |
| 4500 | 10000+ | 10000+ | 350 | 30 |
| 4505 | 10000+ | 10000+ | 10 | 20 |
| 4507 | 10000+ | 10000+ | 30 | 50 |
| 4508 | 10000+ | 10000+ | 400 | 20 |
| 4513 | 10000+ | 10000+ | 400 | 5 |
| 4515 | 10000+ | 10000+ | 140 | 100 |
| 4516 | 10000+ | 10000+ | 110 | 100 |
| 4521 | 10000+ | 10000+ | 50 | 10 |
| 4524 | 10000+ | 10000+ | 20 | 100 |
| 4525 | 10000+ | 10000+ | 40 | 1000 |
| 4532 | 10000+ | 10000+ | 100 | 30 |
| 4533 | 10000+ | 10000+ | 100 | 10 |
| 4534 | 10000+ | 10000+ | 280 | 20 |
| 4535 | 10000+ | 10000+ | 250 | 100 |
| 4544 | 10000+ | 10000+ | 60 | 100 |
| 4545 | 10000+ | 10000+ | 100 | 25 |
| 4546 | 10000+ | 10000+ | 110 | 70 |
| 4554 | 10000+ | 10000+ | 100 | 20 |
| 4555 | 10000+ | 10000+ | 40 | 35 |
| 4556 | 10000+ | 10000+ | 50 | 45 |
| 4564 | 10000+ | 10000+ | 80 | 5 |
| 4565 | 10000+ | 10000+ | 20 | 15 |
| 4566 | 10000+ | 10000+ | 10 | 30 |

FIG. 7

LOW-LEAKAGE VALVE APPARATUS

BACKGROUND OF THE INVENTION

1. Field of the Invention (Technical Field)

The present invention relates to valves, particularly to stem valves, an specifically to a valve having a sealed stem to significantly reduce or minimize liquid/gas/vapor leakage.

2. Background Art

Conventional stem valves feature a movable stem. A valve stem may have a rotating and/or sliding movement within its sleeve throughout the valve's distance of travel; the sealing of the stem must be sufficient to contend with that movement while also maintaining fluid tightness against the pressure of the fluid in the valve.

A widely used type of stem sealing (see FIG. 1, prior art) is accomplished by compressing packing 10 in a gland or stuffing box 12, which may be integral to the valve body 14, or bolted to the valve body. "Packing" is any of a wide variety of compressible materials known in the art (in early valves oakum was used) for providing a seal through which the valve stem 16 can slide. In FIG. 1, the packing 10 is disposed in any number of layers or rings (three in FIG. 1), to improve sealing under pressure while yet permitting the stem 16 to rotate or oscillate. In the stuffing box 12, which also may be called a packing chamber, compressive force is applied to the soft compression packing 10 surrounding a portion of the length of the valve stem 16. The resulting radial pressure of the packing 10 onto the stem 16 provides the desired seal, providing the radial pressure on the stem exceeds the operating pressure of the fluid in the wetted portion 20 of the valve.

Continued reference is made to FIG. 1. Compression is applied to the packing by means of packing bolts 18, which are attached at one end to the body 14 or stuffing box 12 and attached at the opposite end to a packing gland flange 24. The flange 24 may have an integral pusher 26 or other projection bearing on the packing 10, which compresses the packing when the packing bolts 18 are tightened, and therefore, provides the radial pressure for sealing the stem 16. A bushing 21 may be provided at the distal end (as shown in FIG. 1) or both ends of the packing 10 to improve packing security and performance.

It is common to attach a form of spring 28 between the nut 29 and the packing bolt 18 to tighten the flange 24 and thereby holding a constant compression force to the packing 10. The springs 28 are often "Belleville" washers, which are essentially formed as one or more (preferably a series, but one only shown in FIG. 1) elastically compressible dish-shaped washers. Belleville washers have a higher compression rating than an ordinary coil spring, and provide a "live-loaded" packing, which can automatically compensate for changes that may take place in the packing during operation of the valve. Such a "live-loaded" packing system provides a useful amount of self-adjustment to maintain sufficient pressure through the packing 10 onto the valve stem 16.

Additional reference is made to FIG. 2, which depicts a more involved variation of valve prior art. It is also known to install in a single stuffing box 12 a second set of packing 30, which is separated from a first set of packing 10 by a lantern ring 31. Proximate and distal packing rings 21, 21' of suitable durable composition may be provided. Both sets of packing 10, 30 are compressed simultaneously by tightening a common array of packing bolts 18. Accordingly, the two sets of packing 10, 30 within a single stuffing box or packing chamber 12 provide some redundant protection against leakage, between the valve body 14 and the valve stem 16, from the valve's zone of elevated operating pressure 20. Notably, the primary packings 10, 30 can only be compressed simultaneously by the operation of the packing bolt(s) 18; individualized or custom compression of only one set of packing 10 or 30 is not possible.

Some valves known in the art provide a vent or sniffing port 34 in the axial vicinity of the lantern ring 31. By means of the port 34, pressure, sampling, and leakage tests may be performed on the primary packing chamber 12 between the two sets of primary packing 10, 30. It is possible thereby to evaluate the inadequacy of the primary packing—exposing the interior of the primary packing chamber 12 to a large fraction of the system operating pressure. Since in many valves the pressure in the primary packing chamber 12 may approach the valve operating pressure, the port 34 cannot pragmatically serve as a true vent.

As packing 10, 30 wears through use, leaks will generally start to occur where the valve stem 16 interfaces with the packing in the stuffing box 12. One way to reduce or eliminate the leaks is to increase the compression force on the packing 10, 30 by tightening the packing bolts 18. This temporary solution often eventually results in the compression being increased to the point that it is difficult for the valve stem 16 to move smoothly past the packing. Another problem which may occur, and is more severe, is the failure of the packing 10 or 30 due to over-compression, which may result in a large atmospheric release of process fluid from the valve, forcing immediate isolation of the valve from the process. Fugitive emissions from valves are an undesirable occurrence in many industries.

A number of efforts have been made to provide leak-resistant valves. Examples of these efforts are provided in the following United States Patents: U.S. Pat. No. 6,056,005 to Piotrowski, et al.; U.S. Pat. No. 5,203,370 to Block, et al.; U.S. Pat. No. 5,865,441 to Orlowski; U.S. Pat. No. 5,476,117 to Pakula; U.S. Pat. No. 5,178,363 to Icenhower, et al.; U.S. Pat. No. 5,170,991 to Heil; U.S. Pat. No. 5,129,624 to Icenhower, et al.; U.S. Pat. No. 4,901,751 to Story, et al.; U.S. Pat. No. 4,570,942 to Diehl, et al.; U.S. Pat. No. 5,979,491 to Gonsior; and U.S. Pat. No. 4,017,214 to Smith. Known devices, however, may be compromised by various drawbacks. For example, most focus exclusively on preventing any leakage at all from a single primary stuffing box or packing chamber. This often results in the need for high compression on the packings, which can be counter productive especially in high-use valves. Many devices compress simultaneously all the packings in the primary packing chamber, unnecessarily subjecting all packings—which are intended to retain fluid against the system operating pressure—to higher rates of wear.

Against the foregoing background, the present invention was developed.

SUMMARY OF THE INVENTION
(DISCLOSURE OF THE INVENTION)

The invention is a low-leakage valve apparatus which reduces fugitive emissions from valves to the atmosphere. A secondary packing chamber or gland is installed on an existing valve to intercept leakage past the valve's original primary packing gland, which otherwise would escape past the valve stem to the atmosphere.

There is provided according to the invention a secondary packing gland apparatus, attachable to a valve having an axial stem and a primary packing gland with packing therein, the secondary packing gland apparatus comprising:

(1) a primary packing gland flange disposable around a stem in the valve, the primary packing gland flange defining therein a second packing chamber; (2) secondary packing disposed within the second packing chamber; (3) a secondary packing gland flange disposed around the stem, insertable into the second packing chamber, and movable axially in relation to the stem; and (4) adjustable means for connecting the secondary packing gland flange to the primary packing gland flange. The secondary packing is compressible by the secondary packing gland flange, and the means for connecting is adjustable to move the secondary packing gland flange axially to increase and decrease the compression of the secondary packing. Preferably, the primary packing gland flange defines therein an interior annulus for intercepting leakage from the primary packing gland, and further also a vent from the annulus to the exterior of the primary packing gland flange.

Preferably, the secondary packing gland flange features a cylindrical pusher extending toward and contactable with the secondary packing. The adjustable connection means comprises, in the preferred embodiment, the following: at least one secondary packing bolt secured to the primary packing gland flange; at least one secondary packing gland nut threadably engaeable with the at least one secondary packing bolt; and at least one elastically reboundable spring means, such as Belleville washers, disposed upon the at least one secondary packing bolt between the at least one secondary packing gland nut and the primary packing gland flange.

The invention offers an apparatus for improving upon existing valves to reduce fugitive emissions, and is attachable to "retrofit" existing valves for improved leakage prevention. On a valve assembly for regulating the flow of a fluid, the valve assembly including a valve body defining a primary packing gland with packing material packed therein and around a valve stem disposed through the primary packing gland, the invention comprises a secondary packing gland assembly which itself is comprised of: (1) a primary packing gland flange attachable to the valve body, the primary packing gland flange defining therein a second packing chamber; (2) secondary packing disposed within the second packing chamber; (3) a secondary packing gland flange disposed around the stem, insertable into the second packing chamber, and movable axially in relation to the stem; and (4) first adjustable means for connecting the secondary packing gland flange to the primary packing gland flange. The secondary packing is compressible by the secondary packing gland flange, and the means for connecting is adjustable to move the secondary packing gland flange axially to increase and decrease the compression of the secondary packing.

The improvement preferably, further comprises a second adjustable means for connecting the primary packing gland flange to the valve body, the second adjustable connecting means comprising at least one primary packing bolt secured to the valve body, at least one primary packing gland nut threadably engaeable with the at least one primary packing bolt, and at least one elastically reboundable spring means disposed upon the at least one primary packing bolt between the at least one primary packing gland nut and the valve body. The second means for connecting is adjustable to move the primary packing gland flange axially to increase and decrease the compression of the primary packing. The first adjustable connecting means and the second adjustable connecting means preferably are angularly offset from each other in relation to the stem.

In the apparatus, the primary packing gland flange defines therein an interior annulus for intercepting leakage from the primary packing gland, and optionally also a vent from the annulus to the exterior of the primary packing gland flange. The secondary packing gland flange preferably comprises a cylindrical pusher extending toward and contactable with the secondary packing. The first adjustable connecting means is similar to the second, and preferably comprises at least one secondary packing bolt secured to the primary packing gland flange, at least one secondary packing gland nut threadably engaeable with the at least one secondary packing bolt, and at least one elastically reboundable spring means disposed upon the at least one secondary packing bolt between the at least one secondary packing gland nut and the primary packing gland flange. Very preferably, the first adjustable connection means and the second adjustable connecting means are adjustable independently of each other.

A primary object of the present invention is to provide an apparatus for reducing fugitive emissions, which apparatus is simple and can be readily installed on existing valves without the need to invade the existing primary packing of the valve.

A primary advantage of the present invention is that it can be economically retro-fitted onto existing valves.

Another advantage of the invention is that it provides a second packing chamber, or stuffing box, the compression of whose packing can be increased or decreased independently of the compression applied to the valve's primary packing.

Another advantage of the invention is that the secondary packing chamber of the apparatus is exposed to a reduced driving force or pressure, permitting the packing to be subjected to lower packing pressure, thereby extending the life of the apparatus as a useful adjunct to an existing valve.

Yet another advantage of the invention is that it provides a second compartment, outside and independent of the primary packing and the operating pressures that may exist there, in which to collect any leakage past the primary packing chamber.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings:

FIG. 4A is an enlarged side view of the primary packing gland flange component used in a preferred embodiment of the apparatus of the invention;

FIG. 4B is an axial or top view of the primary packing gland flange component depicted in FIG. 4B;

FIG. 5A is an enlarged side (axial) sectional view of the secondary packing gland flange component used in a preferred embodiment of the present invention;

FIG. 5B is a is an axial or top view of the secondary packing gland flange component depicted in FIG. 5A;

FIG. 6A is an enlarged, partially sectional side view of a preferred embodiment of the apparatus of the invention, showing the use of primary packing bolts to attach the inventive primary packing gland flange to an existing valve, and the secondary packing gland flange in place upon the primary packing gland flange;

FIG. 6B is another side view (to different scale) of the preferred embodiment of the apparatus shown in FIG. 6A, rotated 90 degrees around the axial stem, to show the use of secondary packing bolts to adjustably connect the secondary packing gland flange to the primary packing gland flange; and FIG. 7 is a table setting forth before-and-after values of tested fugitive emission concentrations, contrasting the favorably reduced concentrations resulting from the operation of the inventive apparatus.

Figure 1:
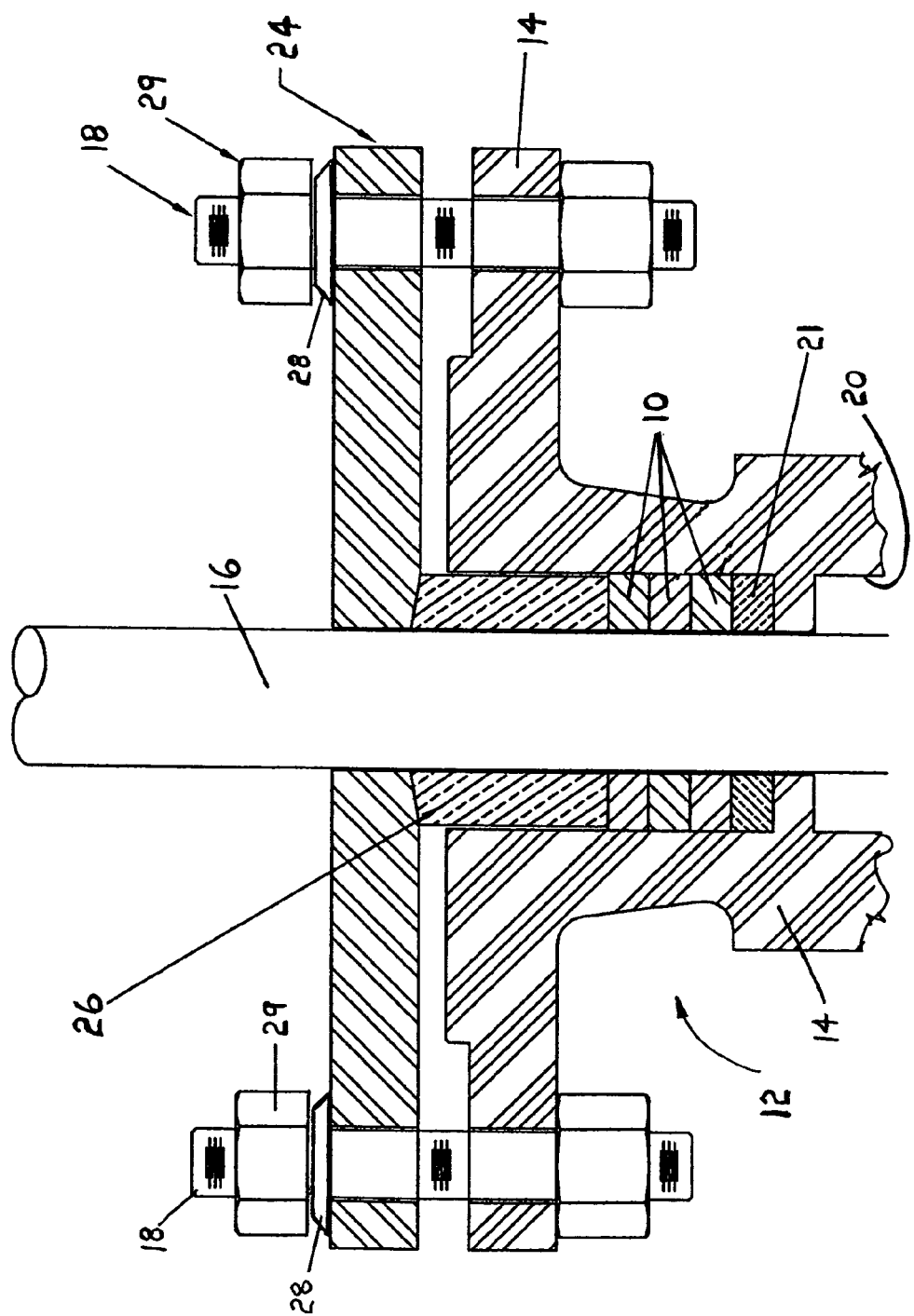
FIG. 1 is a side (axial) sectional view of a portion of a stem valve, with a primary packing chamber, known in the art.

DESCRIPTION OF THE PREFERRED EMBODIMENTS BEST MODES FOR CARRYING OUT THE INVENTION

The present invention is an apparatus for minimizing fugitive emissions from a valve assembly. A second packing gland or chamber is provided which serves to intercept emissions that otherwise would escape from around the valve stem.

Valves are used to regulate the flow of a fluid through a conduit. In many systems, the fluid flows at an operating pressure, and in some industrial delivery systems, the operating pressure may be elevated, sometimes in the hundreds of pounds per square inch (gauge). In the following disclosure and claims, all pressures are in pounds per square inch gauge (psig) unless otherwise indicated. High-pressure fluid pressure can, of course, promote undesirable fluid leakage from the valve.

It is known to provide redundant valve stem packings in an effort to prevent leakage, but previous efforts have focused on redoubling leakage safeguards within a single primary stuffing box or packing chamber. A "primary" packing chamber of a valve is the packing chamber, typically the only packing chamber, intended and configured to contain the fluid flowing at the system operating pressure; that is, it is devised to arrest leakage from a zone of elevated operating pressure to a zone of lower pressure. Thus, with a primary packing chamber, it is contemplated that there is a pressure drop across the chamber, and ideally the pressure drop equals the operating pressure relative to atmospheric pressure (e.g., a condition of no leakage through the primary packing chamber). Many known valve designs have a primary packing chamber which contains primary and secondary packing, and perhaps even tertiary packing, within a single packing chamber (FIG. 2) (or an arrangement effectively constituting a single packing chamber), having the goal of preventing any leakage through such chamber.

The present invention is distinguishable from known designs in several respects, one of which is the provision of a secondary packing chamber that is both physically and functionally separate from the primary packing chamber. With the present invention, it is expected that some measure of leakage inevitably will occur through the primary packing chamber, regardless of the number of individual packing sets that may be provided therein. Thus, instead of striving to prevent any leakage whatsoever from the valves's zone of operating pressure, the present invention accepts that such leakage will occur and reliably intercepts such leakage.

The secondary packing chamber of the present invention is devised to intercept leakages at significantly lower pressures. The invention contemplates two pressure drops: a first pressure drop across the primary packing chamber, and a second pressure drop across a secondary packing chamber. In a new, non-leaking valve, the first pressure drop may equal the system operating pressure; such equilibrium is upset when leakage occurs across the primary packing chamber, so that the fluid under pressure is pushed past the primary chamber. Nevertheless, despite the leakage, the pressure drop across the first packing chamber is significant, and may be only s few p.s.i. less than the operating pressure.

The second packing chamber according to the present invention then intercepts the leakage. However, the pressure drop across the second packing chamber is a small fraction of the operating pressure, the primary packing chamber still resisting most of the operating pressure and preventing most of the leakage. A second pressure drop is established across the second packing chamber, which second pressure drop is approximately equal to the difference between the operating pressure and the differential across the primary packing chamber. An advantage of the invention is that the second packing chamber need be configured to resist only this comparatively smaller second pressure drop. When the invention is functioning to prevent any fugitive emissions, the sum of the first and second pressure drops is approximately equal to the system operating pressure.

This invention provides a novel modification to the existing primary packing gland assembly, easily mountable to an existing valve, to provide a secondary packing chamber.

Figure 2:
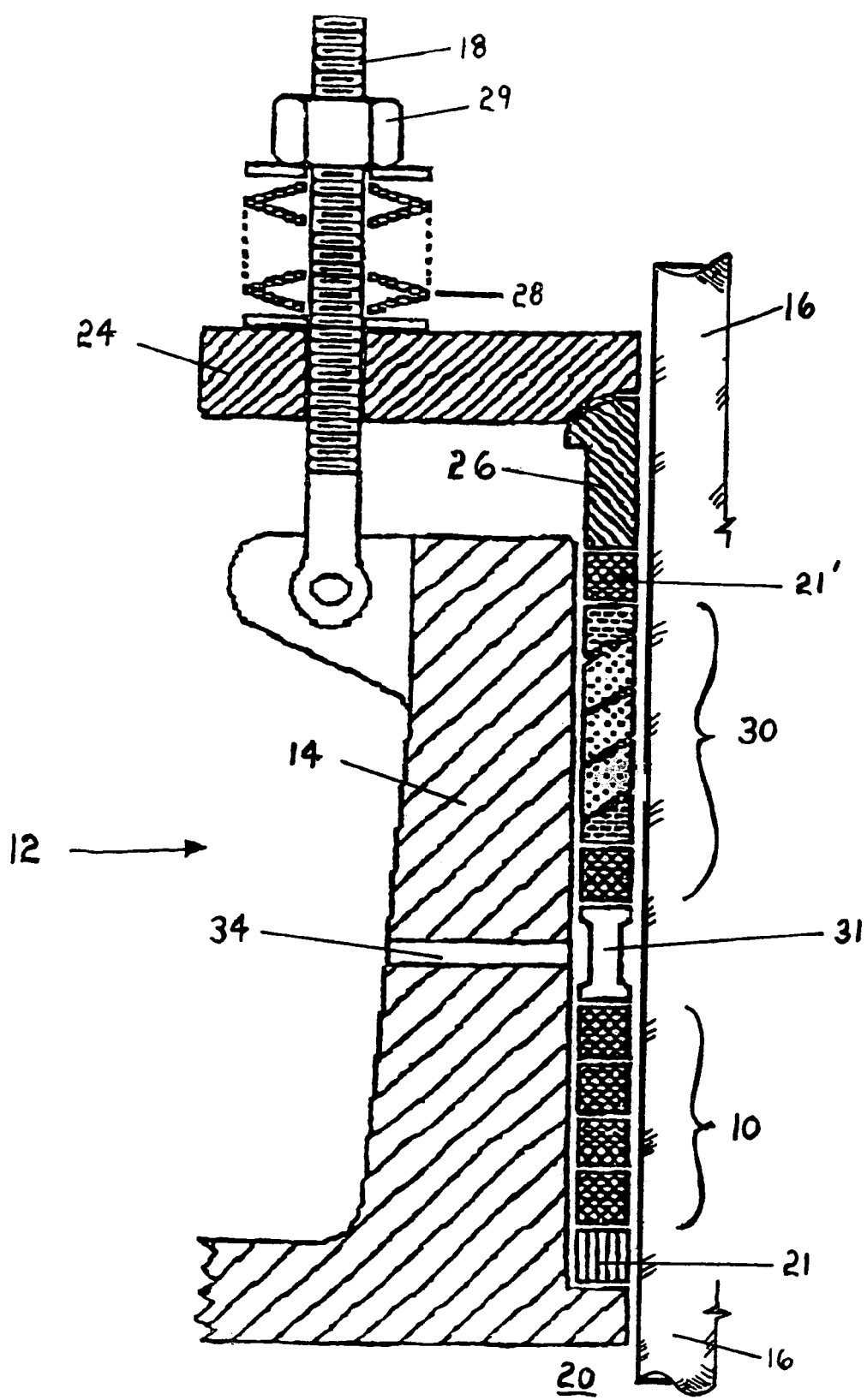
FIG. 2 is a side (axial) sectional view of a portion of another stem valve known in the art (but different from the version depicted in FIG. 1), with a primary packing chamber.
Figure 3:
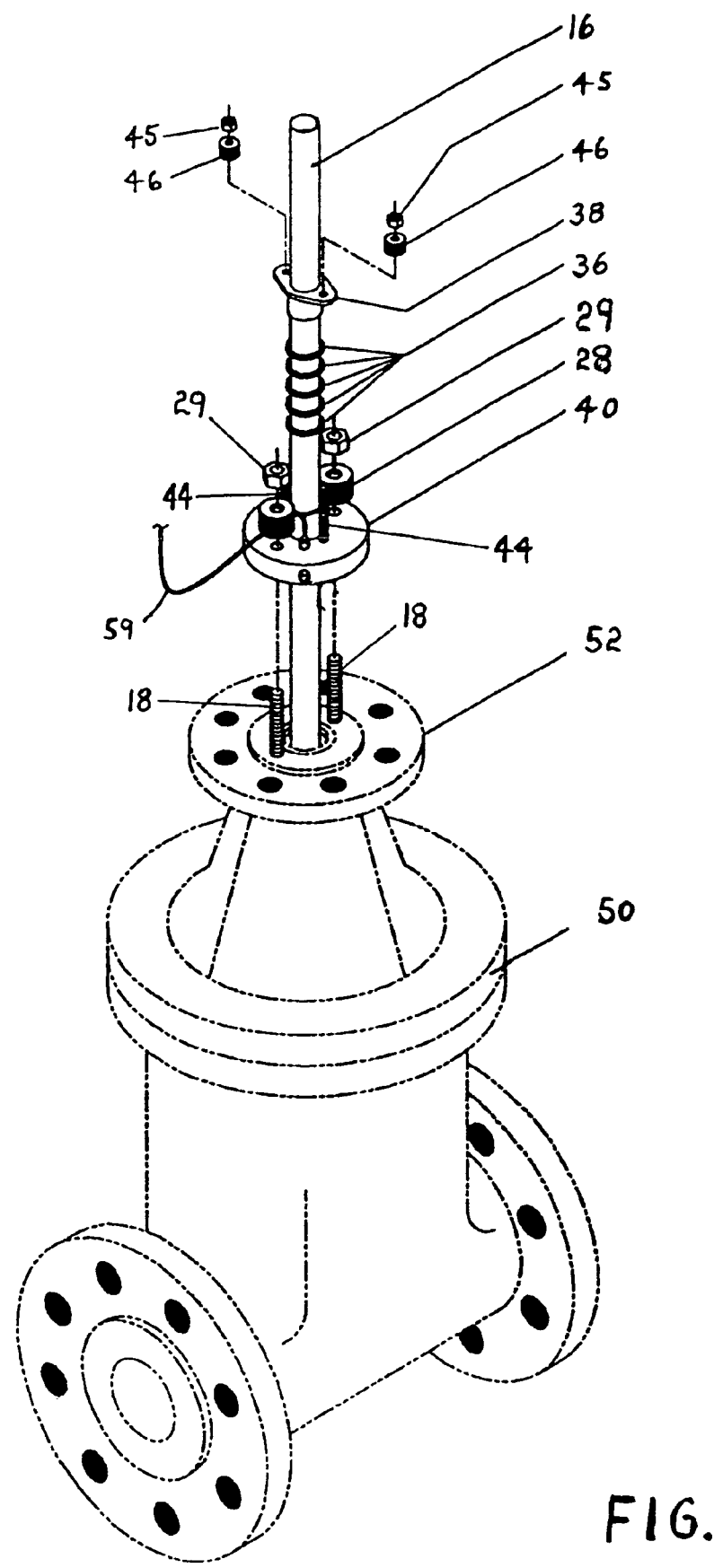
FIG. 3 is a partially exploded perspective view of a preferred embodiment of the apparatus according to the present invention, as the embodiment may be mounted upon a conventional valve assembly.

In the invention, the primary packing, within the primary stuffing box or packing chamber, is accomplished generally in accordance with the known art. In FIG. 3, the packing bolts 18 and associated nuts 29 compress a stacked series of Belleville washers 28, 28' to drive the primary flange 40 (element 24 in FIG. 2) and the packing pusher 26 in a downward direction to maintain pressure upon the primary packing 10, 30 (as seen in FIG. 2). It is preferable, but not critical, to apply the Belleville washer "live-loading" on the primary packing bolts 18. The primary packing elements 10, 30 seal against process pressure (which may be in excess of several hundred pounds per square inch gauge (psig) on up. If only the primary packing is present, then the driving force for leakage at the valve stem 16 is the process pressure, minus atmospheric pressure, plus the resistance to leakage of the elements of the primary packing 10, 30. Known valve primary packing designs provide enough security against leaks such that a VOC (volatile organic compounds) leakage would be considered safe from combustion/explosion, because the VOCs rapidly dissipate in the surrounding air. But from an environmental standpoint, currently VOC emissions exceeding 10,000 ppm from a valve are unacceptable and repairs are required to reduce the VOC emissions to below 10,000 ppm.

Reference is made to FIG. 3. An aspect of the apparatus of the invention is an improved primary packing gland flange (identified at 40 in FIG. 3, modified from element 24 in FIGS. 1 and 2) to provide a secondary stuffing box or packing chamber mountable upon a conventional valve assembly 50. The invention is useable, or adaptable to be used, on nearly any type of existing valve 50, including ball valves, gate valves, globe valves, and the like. It is to be immediately understood that the valve assembly 50 includes, in its interior portions below its actuator mounting flange 52, a primary packing chamber containing one or more sets of packings, generally in accordance with the known art depicted in FIG. 1 or FIG. 2. An advantage of the invention is that most known valves can be economically retrofit with the inventive apparatus, without having to modify or even remove, or otherwise disturb, the existing primary packing components of the existing "off-the-shelf" valve 50. Desirably, the problem valves requiring frequent maintenance to reduce emissions throughout an entire industrial plant can be economically upgraded against leakage, by means of retrofitting the valves with the apparatus of the invention with minimal downtime to plant systems operations. Conversely, problem valves can be replaced with new valves, incorporating the invention, purchased directly from the manufacturer. Of course, in new plant construction, originally installed valves may feature the invention.

FIG. 3, which is an exploded view, shows the principal components of the invention and their positional relationships. The existing valve 50 has the ordinary pair of primary packing studs or bolts 18 extending rigidly from the actuator mounting flange 52. The inventive apparatus similarly can be installed on manual valves; the apparatus simply is attached to the yoke-style mounting of the valve. As explained above, the primary bolts 18 ordinarily are used to attach a conventional packing gland flange 24 to the valve 50; in the invention, they provide a means for attaching a specially modified flange 40 in lieu of a standard flange 24.

The inventive primary packing gland flange 40, which is further described herein, is connected to the actuator mounting flange 52 by the primary packing bolt nuts 29 generally as known in the art. The primary packing gland flange Belleville washers 28 are disposed intermediate to the nuts 29 and the flange 40, also as previously described. The nuts 29 and washers 28 on the primary bolts 18 permit the primary packing gland flange 40 to compress the primary packing within the primary packing chamber of the existing valve 50, below the actuator mounting flange 50, to be adjusted according to convention.

Disposed about the valve stem 16 are a plurality of commercially available secondary packing chamber packing rings 36 or other suitable packing. The secondary packing 36 is pushed into the primary packing gland flange 40 by the secondary packing gland flange 38, which is slidably disposed around the stem 16 and movable axially thereon. Projecting axially from the primary packing gland flange 40 are a pair of secondary packing bolts 44. The secondary packing bolts 44 are insertable through corresponding holes in the secondary packing gland flange 38, so that the secondary gland flange can be secured to the primary packing gland flange 40 by means of secondary packing gland nuts 45 with intermediately disposed secondary packing gland Belleville washers 46. The mode of attaching the secondary packing gland flange 38 to the primary packing gland flange 40 thus is similar in form and function to the mode of attaching the primary packing gland flange 40 to the actuator mounting flange 52. Noteworthy from FIG. 3 is that the angular positions (relative to the stem 16) of the secondary packing bolts 44 are offset by approximately ninety degrees from the primary packing bolts 18. Not only does this right-angle radial offset relation between the respective pairs of bolts 18 and 44 promote easier access to both sets of adjusting nuts 29, 45, but it also results in a more spatially compact apparatus overall.

The secondary packing gland sleeve (surrounding chamber 41) thus is integral to the primary packing gland flange 40, with the secondary flange bolts 44 mounted 90° from the primary packing flange bolts 18, so as not to inhibit accessibility for maintenance (see FIG. 3). The secondary packing bolt nuts 45 compress the Belleville washers 46 to drive the secondary flange 38 axially downward to exert pressure upon the secondary packing 36. It is recommended, but not essential to use the "live-loading" (Belleville washers or springs) on the secondary packing bolts 44.

FIGS. 4A and 4B show the details of the inventive primary packing gland flange 40. The flange 40 is hollow, as it surrounds and defines a secondary packing gland chamber 41. The gland chamber 41 is generally cylindrical, and receives the secondary packing 36 therein as well as permitting the stem 16 to extend there through. An annular packing retainer ridge 48 helps hold the secondary packing, such as packing rings 36, within the chamber 41 when the apparatus is fully assembled. Primary bolt holes 54 permit the passage through the flange 40 of the primary flange bolts 18. The smaller secondary bolt holes 55 are threaded to receive the screwed engagement therein of the secondary flange bolts 44 which are secured to and protrude from the flange 40 as seen in FIG. 3.

An advantage of the apparatus of the invention is the provision in the primary packing gland flange 40 of an compartment or annulus 42 that serves to collect any leakage past the primary packing chamber or stuffing box 12 (FIGS. 1 and 2). There also is provided in the flange 40 a vent 57 extending radially from the annulus 42. The vent 57 is normally plugged with a removable plug at its distal end, but features a tap 58 which may be in fluid communication, via a pipe, tubing, or hose 59 (FIG. 3) to a low pressure system to collect (or combust) any leaks from the primary packing which would otherwise be released to the atmosphere.

The secondary packing flange 38 is shown in detail in FIGS. 5A and 5B. The secondary flange 38 features a pusher 61 or other projection (preferably integral with the flange 38), which bears on the secondary packing 36 to compresses the secondary packing within the second packing chamber 41 (which is part of the primary packing gland follower) when the packing bolts 45 are tightened. Combined reference to FIGS. 3, 5A, and 5B illustrate that secondary packing bolts 44 are insertable through the bolt holes 39 in the secondary flange 38.

Reference is made to FIGS. 6A and 6B, which provide enlarged side and sectional views of the secondary packing gland 38 according to the invention, in place with the inventive primary packing flange 40. Tightening of the secondary packing bolts 45 provides the radial pressure for sealing the stem 16 against any leakage past the primary packing. The resulting radial pressure of the secondary packing 36 against the stem 16 furnishes the desired seal, providing the radial pressure on the stem 16 exceeds the pressure of the fluid in the annulus 41. Secondary packing nuts 45 are typically hand-tightened to extend the life of the secondary packing 36, and therefore, double nuts may used to secure the secondary packing loading pressure. However, an advantage of the invention is that since the pressure in the secondary compartment or annulus 42 is relatively low, thereby significantly reducing the necessary packing compression.

Leakage from the valve 50 (along the valve stem 16) to atmosphere is drastically reduced because the driving force for leakage is reduced to the difference between the low pressure vent system (as attached to the line 59 of FIG. 3) and atmospheric pressure, plus the resistance from the secondary packing 36. The driving force on the primary packing approximates the operating pressure. In the same system incorporating the present invention the driving force on the secondary packing 36 will be a fraction of the valve's operating pressure. The effectiveness of the existing valve 50 thus is complemented—not replaced—by the apparatus of the invention.

Any emissions that leak from the primary packing (10, 30 in FIGS. 1 and 2) are vented through the annulus 42 in the primary packing gland flange 40 to a governmentally approved combustion device (flare system, process heater burner, boiler burner, incinerator, etc.) or a vapor recovery unit. Most process plants that have volatile organic compound (VOC) emissions have U.S. Environmental Protection Agency approved combustion devices and/or vapor recovery units.

An optional advantage of the invention is that the annulus 42 of the secondary packing gland can be deliberately pressurized, e.g., via the vent 57 at a selected low pressure. Such an induced back pressure, while potentially modest compared to the system's operating pressure, can nevertheless provide added protection against leakage past the primary packing chamber. Further, such back pressure may be provided with nitrogen or some other inert gas, which provides added protection against leakage of, for example, toxic process gasses. It is noted, though, that various uses may be made of the vent 57 and/or the tap 58. The vent can be plugged during operation, serve as a "sniff port," or to introduce a selected seal gas.

The nuts 29 on the primary packing bolts 18 are torqued or set in accordance with the recommendations of the original manufacturer of the valve 50. The secondary packing nuts 45 are independently torqued to a minimal radial pressure based on permissible fugitive emissions to the atmosphere, whether the vent 57 is used or not.

The components of the apparatus may be fabricated from any suitable material and by any suitable method. However, it is preferred the components consist of carbon steel or stainless steel which have been machined. The secondary packing rings 36 may be formed of commercially available elastomers and/or conventionally used material of construction. The rings 36 may are contained in a second stuffing box (packing chamber) surrounding the stem 16 where the packing may be compressed axially between a portion of the valve body and a movable sleeve or gland. The packing may be in the form of a multiplicity of rings of the packing material. An advantage of the invention also is that the threads of the packing bolts 18, 44 and their associated compression adjusting packing nuts 29, 45 are isolated from the wetted portions of the valve, and thus are protected from potentially corrosive affects from the process fluid(s).

A significant advantage of the invention is that it focuses on intercepting any leakage that may escape through the primary packing chamber by flowing between the valve stem and primary packing material. The invention recognizes that minimal leakage occurs between the packing material (e.g. 10, 30 in FIG. 2) and the wall of the packing chamber 12. This recognition permits the implementation of the inventive apparatus configuration whereby the compression of the secondary valve packing can be adjusted, or the entire secondary packing removed and replaced, independently of the condition or compression of the primary packing in the primary stuffing box. In some prior art valves, a controlling effort is made to prevent leakage between the primary packing and the wall of the primary packing chamber, which efforts may involve a divided valve body with intermediate O-ring seals, which also prevent adjustment of the compression of primary packing material above the O-ring versus below.

In the invention, removal of the entire secondary packing assembly (including flanges 38, 40 and packing 36), by detaching the primary packing nuts 29 from the primary packing bolts 18, permits access to the primary packings (10, 30 in FIG. 2) without wholly disturbing the secondary packing 36. The two packings, primary and secondary, thus may be independently managed, compressed, or replaced, since the two means for adjustably connecting (i.e., the two respective sets of packing bolts 18, 44 with accompanying spring washers 29, 46 and nuts 29, 45 the flanges 40 and 38) to their respective foundations are can be manipulated to cause axial movement of the secondary flange 38 without shifting the primary packing flange 40.

While the foregoing description of the invention has been presented for purposes of illustration and description, it is not intended that the invention be limited to the precise form disclosed. For example, coil springs or other spring means might be employed in lieu of Belleville washers. Or the invention may be utilized without the vent, as described, although the packing life may be reduced. This invention is unique owing to the use of the primary and secondary stuffing box adjustments, with or without the vent, and significantly reducing the necessity of costly valve modifications.

INDUSTRIAL APPLICABILITY

The invention is further illustrated by the following non-limiting examples.

EXAMPLE 1

An apparatus was designed and assembled generally in accordance with the foregoing disclosure, and installed upon 8-inch and 10-inch actuated gate valves in a fluid stream within a process system at a crude oil refinery. Such valves, as with many valves in complex industrial processes, cycle from the fully open position to the fully closed position tens of thousands of times annually. Reference is made to FIG. 7, tabulating the testing of VOC emissions to the atmosphere in the present example. A series of tests were conducted, two series on the valves prior to the installation of the apparatus, and two series on the same valves after apparatus installation. In all series, the concentration of fugitive VOC emissions to the atmosphere was measured at the valve using accepted Environmental Protection Agency testing procedures. Emissions were in excess of 10,000 ppm for all pre-installation tests, as seen in the table of FIG. 7. Post-installation tests indicated dramatic reductions in fugitive emission concentrations.

The preceding examples can be repeated with similar success by substituting the generically or specifically described reactants and/or operating conditions of this invention for those used in the preceding examples.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A secondary packing gland apparatus, attachable to a valve assembly comprising an axial stem and a primary packing, said secondary packing gland apparatus comprising:
    a primary packing gland flange disposable around said stem, said primary packing gland flange defining therein a second packing chamber;
    secondary packing disposed within said second packing chamber;
    a secondary packing gland flange disposed around said stem, insertable into said second packing chamber, and movable axially in relation to said stem;
    first adjustable means, comprising at least one secondary packing bolt, for connecting said secondary packing gland flange to said primary packing gland flange; and
    second adjustable means, comprising at least one primary packing bolt separate from said secondary packing bolt, for connecting said primary packing gland flange to said valve assembly;
wherein said secondary packing is compressible within said second packing chamber by said secondary packing gland flange, and said first means for connecting is adjustable to move said secondary packing gland flange axially to increase and decrease the compression of said secondary packing, and
    wherein further said primary packing is compressible within said valve assembly by said primary packing gland flange, and said second means for connecting is adjustable to move said primary packing gland flange axially to increase and decrease the compression of said primary packing, and wherein further said first adjustable connecting means and said second adjustable connecting means are adjustable independently of each other.

2. An apparatus according to claim 1 wherein said primary packing gland flange defines therein an interior annulus for intercepting leakage from the primary packing gland.

3. An apparatus according to claim 2 further comprising a vent from said annulus to the exterior of said primary packing gland flange.

4. An apparatus according to claim 1 wherein said secondary packing gland flange comprises a cylindrical pusher extending toward and contactable with said secondary packing.

5. An apparatus according to claim 1 wherein said first adjustable connection means comprises:
    at least one secondary packing bolt secured to said primary packing gland flange;
    at least one secondary packing gland nut threadably engageable with said at least one secondary packing bolt; and
    at least one elastically reboundable spring means disposed upon said at least one secondary packing bolt between said at least one secondary packing gland nut and said primary packing gland flange.

6. An apparatus according to claim 5 wherein said spring means comprises at least one Belleville washer.

7. A valve assembly for regulating the flow of a fluid, the valve assembly including a valve body defining therein a primary packing chamber with primary packing packed around a valve stem disposed through said primary packing chamber, said valve assembly further comprising a secondary packing gland assembly comprising:
    a primary packing gland flange attachable to said valve body, said primary packing gland flange defining therein a second packing chamber;
    secondary packing disposed within said second packing chamber;
    a secondary packing gland flange disposed around said stem, insertable into said second packing chamber, and movable axially in relation to said stem; and
    first adjustable means for connecting said secondary packing gland flange to said primary packing gland flange;
    a second adjustable means for connecting said primary packing gland flange to said valve body;
wherein said second packing chamber is entirely separated from said primary packing chamber;
wherein said secondary packing is compressible by said secondary packing gland flange, and said first means for connecting is adjustable to move said secondary packing gland flange axially to increase and decrease the compression of said secondary packing, and wherein said first adjustable connecting means and said second adjustable connecting means are adjustable independently of each other; and
further wherein said first adjustable connecting means and said second adjustable connecting means are angularly offset from each other in relation to said stem.

8. An apparatus according to claim 7 wherein said second adjustable connecting means comprises:
    at least one primary packing bolt secured to said valve body;
    at least one primary packing gland nut threadably engageable with said at least one primary packing bolt; and
    at least one elastically reboundable spring means disposed upon said at least one primary packing bolt between said at least one primary packing gland nut and said primary packing gland flange;
wherein said second means for connecting is adjustable to move said primary packing gland flange axially to increase and decrease the compression of said primary packing.

9. An apparatus according to claim 7 wherein said primary packing gland flange defines therein an interior annulus for intercepting leakage from the primary packing chamber.

10. An apparatus according to claim 9 further comprising a vent from said annulus to the exterior of said primary packing gland flange.

11. An apparatus according to claim 7 wherein said secondary packing gland flange comprises a cylindrical pusher extending toward and contactable with said secondary packing.

12. An apparatus according to claim 7 wherein said first adjustable connecting means comprises:
    at least one secondary packing bolt secured to said primary packing gland flange;
    at least one secondary packing gland nut threadably engageable with said at least one secondary packing bolt; and
    at least one elastically reboundable spring means disposed upon said at least one secondary packing bolt between said at least one secondary packing gland nut and said primary packing gland flange.

13. On a valve for regulating the flow of a fluid, the valve including a valve stem and a primary packing chamber with primary packing material disposed therein and around the valve stem, the improvement comprising a secondary packing gland assembly removably attachable to the valve, said secondary packing gland assembly comprising:

a primary packing gland flange attachable to the valve, said primary packing gland flange defining therein a second packing chamber;

secondary packing material disposed within said second packing chamber;

a secondary packing gland flange disposable around the valve stem, inserted into said second packing chamber, and movable axially in relation to said primary packing gland flange;

first adjustable means for connecting said secondary packing gland flange to said primary packing gland flange, said first adjustable connecting means comprising:

at least one secondary packing bolt secured to said primary packing gland flange; and at least one secondary packing gland nut threadably engageable with said at least one secondary packing bolt; and second adjustable means for connecting said primary packing gland flange to said valve, said second adjustable connecting means comprising:

at least one primary packing bolt threadably engageable into said valve; and at least one primary packing gland nut threadably engageable with said at least one primary packing bolt;

wherein said secondary packing material is compressible within said second packing chamber by said secondary packing gland flange, and said first means for connecting is adjustable to move said secondary packing gland flange axially in relation to both the stem and said primary packing gland flange to adjust the compression of said secondary packing material, and wherein further said primary packing material is compressible within the primary packing chamber by said primary packing gland flange, and said second means for connecting is adjustable to move said primary packing gland flange axially in relation to the valve to adjust the compression of the primary packing material, and wherein further wherein said first adjustable connection means and said second adjustable connecting means are independently adjustable.

14. The improvement of claim 13 wherein said first adjustable connecting means further comprises at least one elastically reboundable spring means disposed upon said at least one secondary packing bolt between said at least one secondary packing gland nut and said primary packing gland flange.

15. The improvement of claim 13 wherein said second adjustable connecting means further comprises at least one elastically reboundable spring means disposed upon said at least one primary packing bolt between said at least one primary packing gland nut and primary packing gland flange;

wherein said second means for connecting is adjustable to move said primary packing gland flange axially to increase and decrease the compression of said primary packing.

16. The improvement of claim 13 wherein said first adjustable connecting means and said second adjustable connecting means are angularly offset from each other in relation to said stem.

17. The improvement of claim 13 wherein said secondary packing gland assembly is removable from the valve containing undisturbed primary packing material.

18. A secondary packing gland apparatus, attachable to a valve assembly comprising an axial stem and a primary packing, said secondary packing gland apparatus comprising:

a primary packing gland flange attachable to the valve, said primary packing gland flange defining therein a second packing chamber;

secondary packing material disposed within said second packing chamber;

a secondary packing gland flange disposable around the valve stem and movable axially in relation to said primary packing gland flange;

first adjustable means for connecting said secondary packing gland flange to said primary packing gland flange, said first adjustable connecting means comprising at least one secondary packing bolt secured to said primary packing gland flange; and second adjustable means for connecting said primary packing gland flange to said valve, said second adjustable connecting means comprising at least one primary packing bolt threadably engageable into said valve; and wherein said secondary packing material is compressible within said second packing chamber by adjustment of said first means for connecting to move said secondary packing gland flange; and wherein further said primary packing material is compressible, separately from said secondary packing material, within the primary packing chamber by adjustment of said second means for connecting to move said primary packing gland flange.

* * * * *